United States Patent [19]

Serras-Paulet

[11] 4,288,787

[45] Sep. 8, 1981

[54] CONTROL KEYBOARD WITH SWITCHES OF MECHANICAL CONSTRUCTIONS

[76] Inventor: Edouard Serras-Paulet, Casa Nostra - Pêch des Treilles, 82240 Puylaroque, France

[21] Appl. No.: 26,763

[22] Filed: Apr. 3, 1979

[30] Foreign Application Priority Data

Jan. 17, 1979 [FR] France ............................ 79 01101

[51] Int. Cl.[3] ............................................ G06F 3/02

[52] U.S. Cl. ............................ 340/365 R; 200/16 D

[58] Field of Search ............ 340/365 R, 365 S, 365 L, 340/365 E, 166 R; 178/17 C; 200/16 D; 179/90K

[56] References Cited

U.S. PATENT DOCUMENTS 4,012,608 3/1977 Lockard ........................ 200/16 D 4,145,687 3/1979 Masuda ........................ 340/365 S

*Primary Examiner*—Thomas A. Robinson

*Attorney, Agent, or Firm*—Haseltine and Lake

[57] ABSTRACT

A keyboard wherein each key is provided with a biasing means for urging the same back to a rest position and is operatively coupled to at least one single-pole switch, the switches being electrically connected to a system of conductors arranged in matrix configuration with m rows and n columns. Each row and each column consists of a conductor whereby a switch of i, j co-ordinates is connected between the row i and the column j of the system. The switches have normally closed contacts and a diode is connected in series with each switch and each series connection of a diode with a switch of i, j co-ordinates is connected between the row i conductor and the column j conductor of the system, the connecting direction of the diodes being the same between rows and columns.

5 Claims, 2 Drawing Figures

CONTROL KEYBOARD WITH SWITCHES OF MECHANICAL CONSTRUCTIONS

FIELD OF THE INVENTION

The invention relates to a new kind of control keyboard of simple and inexpensive design as well as to machines and equipment provided with such a keyboard.

PRIOR ART

It is known that in electronic or electromechanical plants a control keyboard is a relatively expensive subunit or sub-assembly with a rather poor reliability compared with that of electronic devices, in particular with digital logical circuits which are associated therewith. Therefore in such plants the keyboard often is the weak link of the system. The most rudimentary keyboard models use a simple switch adapted to convey a voltage and operatively coupled with each key or like press button or push-button for converting the manual depression of the key into a usable electric signal. Such keyboards exhibit two major drawbacks:

the wear of the contact pieces of the switches results in time in an impairment of the resulting electrical signal, the great number of leads or wires required for transmitting data.

With respect to the first aforesaid inconvenience it has been suggested to substitute for the mechanical switches other types of sensors or detectors (capacitive, photoelectric or other). A significant improvement was achieved with the use of Hall-effect cells since such cells exhibit the advantage of conveying a relatively "clean" electric signal i.e. a signal which may very easily be identified by the digital logic circuits. This has however led to excessively high cost in most of the applications intended for the general public.

Moreover, it is known how to reduce the number of connecting wires connected to the keyboard by making use of a system or network of conductors arranged in a matrix-like configuration (comprising for instance m rows and n columns) and by associating one key or push-button of the keyboard with each intersection between a row and a column, so that an electric signal is likely to be conveyed between one row and one column by depressing the corresponding key thereby causing a simple switch to be closed or the operation of a Hall-effect cell or also the operation of another sensor as previously mentioned. In other words with each key of the keyboard, i.e. with each switch, if such a means is selected in view of its advantageous cost price, are associated co-ordinates i, j ($1 \leqq i \leqq m; 1 \leqq j \leqq n$) and this switch is connected between the row i and the column j, each key being thus located within the electronic processing equipment by its co-ordinates i and j. It is easy to ascertain that with a such system ($m \cdot n$) keys may be distinguished with only ($m+n$) conductor wires being connected to the keyboard.

There, however, remains the disadvantage that the system or network of conductors arranged according to a matrix-like configuration does not improve the reliability if it is desired to make use of switches of mechanical construction. The difficulty especially arises from the fact that the electrical contact is not made cleanly at the closing of the switch, i.e. when the corresponding keyboard is depressed.

SUMMARY OF THE INVENTION

The basic principle of the invention originates from the simple discovery that it is easier in relation to electronic processing circuits to detect or to sense an absence of a signal (i.e. the opening of a normally closed switch) than a signal transmitted through a badly made electric contact (i.e. a defective closing of a normally open switch). Starting from that simple discovery the invention proposes to make use of switches having a mechanical structure (for reasons of cost), with normally closed contacts (for reasons of reliability) interconnected with a system or network of conductors arranged in a matrix-like configuration (in order to simplify the wiring of the keyboard proper).

According to the invention, this threefold object is accomplished with a keyboard structure wherein each key is provided with a biasing means for urging or drawing the same back to a rest position and is operatively coupled with at least one single-pole switch, of the kind according to which said switches are electrically connected to a network or system of conductors arranged in a matrix-like configuration having m rows and n columns, each row and each column being carried out as a conductor so that a switch of i, j co-ordinates is connected between the row i and the column j of the system or network; said structure being characterized in that said switches are of the type having normally made or closed contacts, a diode-like element is connected in series with each switch and each series connection of a diode-like element with a switch of i, j co-ordinates is interconnected between the row i conductor and the column j conductor of said system; the directions of connection of the diodes being the same between rows and columns.

Due to the provision of a diode connected in series with each switch, it may be avoided that the whole system of conductors arranged in a matrix-like configuration be electrically equivalent to a multiple short-circuit caused by the presence of a switch with a normally closed or made contact at each intersection between a line and a column.

The invention also relates to any machine fitted with a keyboard, characterized in that it is provided with a keyboard such as previously defined and in that it moreover comprises a signal generator with multiplexed outputs, the outputs of which are connected to the row (or column) conductors of said keyboard, a signal analyzer with multiplexed inputs, the inputs of which are connected to the column (or row) conductors, respectively, of said keyboard, a first sequential, drive or monitoring means connected to said signal analyzer and a second sequential, drive or monitoring means connected to said signal generator; said first and second drive or monitoring means having different operating frequencies.

By "multiplexed outputs" is meant the fact that the signal generator is designed for causing a significant electric signal to sequentially and cyclically appear at all outputs with a determined sweep frequency. Likewise by "multiplexed inputs" is meant the fact that the signal analyzer is designed to sequentially and cyclically measure the signals applied to its inputs, with a determined sweep frequency. Preferably, the sweep frequency of the analyzer is much higher than that of the generator so that when a signal is momentarily generated at one of the outputs of the generator, the analyzer has enough time to scan all its inputs.

BRIEF DESCRIPTION OF THE DRAWINGS

The invention will be better understood and further objects, characterizing features, details and advantages thereof will appear more clearly when reading the following explanatory description with reference to the accompanying diagrammatic drawings given by way of non-limiting example only illustrating a presently preferred specific embodiment of the invention and wherein.

DETAILED DESCRIPTION

Figure 1:
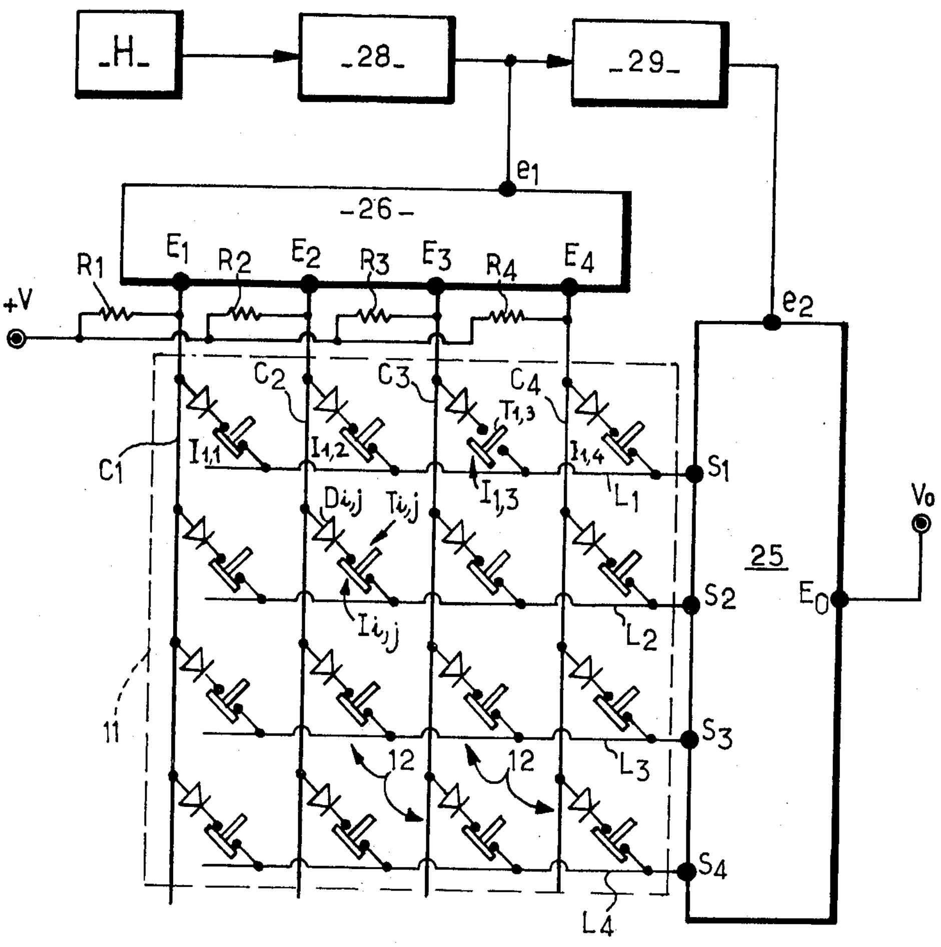
FIG. 1 is a diagram showing the electrical arrangement of the keyboard as well as the ancillary electronic devices making it possible to identify the co-ordinates of the keys of this keyboard.

Referring to the drawings, there has been shown the electric circuit diagram of a keyboard 11 seen in FIG. 1. Each key $T_{i,j}$ of the keyboard actually forms a single-pole switch $I_{i,j}$ having a simple mechanical structure. Each key is provided with a biasing means (not shown) for urging or drawing the same back to a rest position and which may be of a conventional type but preferably is a "magnetic biasing" system such as the one described in the French patent application Ser. No. 78 33733 filed on Nov. 29, 1978 in the name of the applicant. It is also quite conceivable to make use of a push-means or like press-member independent of the switch proper which may then be a sub-unit or sub-assembly of the "micro-contact" or other type. Moreover, the keyboard 11 includes a network or system 12 of conductors arranged in a matrix-like configuration, i.e. comprising m rows and n columns, each row and each column being carried out as a conductor electrically independent of the others. In the drawing has been shown a keyboard with 16 keys or push-buttons the switches of which are electrically connected to a system of four rows and four columns (m=n=4) respectively consisting of four row conductors ($L_1$, $L_2$, $L_3$, $L_4$) and of four column conductors ($C_1$, $C_2$, $C_3$, $C_4$) electrically independent of each other i.e. which may be interconnected with each other only through other circuit branches or portions in particular including the aforesaid single-pole switches. At this juncture it should be specified that the terms "system or network of conductors arranged in a matrix-like configuration" do not mean that the device according to the invention has a particular wiring configuration and in particular a crossed configuration as shown in FIG. 1. The crossed configuration however is technologically advantageous. With "matrix-like configuration" is merely meant that there has been defined two groups of conductors (conveniently referred to as "rows"and "columns") so as to carry out at least one part of the selective interconnections possible between rows and columns by means in particular of the single-pole switches. Under said circumstances it should be understood that whatever the geometrical configuration of the system or network of conductors L, C may be, each switch associated or combined with each key T may be defined by its co-ordinates (i, j) so that the switch $I_{i,j}$ is the one which is connected to the conductor forming the row i and to the conductor forming the column j.

According to the invention, the switches $I_{i,j}$ are of the "normally closed contact" type and a diode forming element $D_{i,j}$ is connected in series to each switch so that each series connection of a diode $D_{i,j}$ with a switch $I_{i,j}$ is interconnected between the switch of the row i and the switch of the column j. Moreover, the direction of connection of the diodes is the same between rows and columns. Thus in the examplary embodiment described, the anodes of the diodes are all connected to the conductors defining the columns.

The operation of the keyboard which has just been described is very simple. If a significant electric signal, i.e. a voltage of suitable polarity is applied to one of the row conductors (for instance $L_1$) it is obvious that this signal will appear in each column conductor ($C_1$, $C_2$, $C_3$, $C_4$) because the switches $I_{1,1}$, $I_{1,2}$, $I_{1,3}$, $I_{1,4}$ are all "normally closed". If however one of the keys $T_{1,j}$ (for instance $T_{1,3}$) is depressed the corresponding switch ($I_{1,3}$) opens and an absence of any signal in the conductor $C_3$ may be verified. Indeed the diodes connected in series with the other switches do not let the significant signal pass towards the conductor $C_3$ through the agency of said switches so that the conductor $C_3$ is isolated as long as the significant signal remains applied to the conductor $L_1$ and the key $T_{1,3}$ is being depressed. It is sufficient to associate with the keyboard an electronic device for cyclically scanning the rows and the columns (a non-limiting embodiment of which will be described hereinafter) and operating at a cyclically scanning speed high enough and in particular very much larger than the greatest velocity of an operator using the keyboard, in order that the whole keyboard be analyzed periodically and that the depression of any key whatsoever be unfailingly detected.

Figure 2:
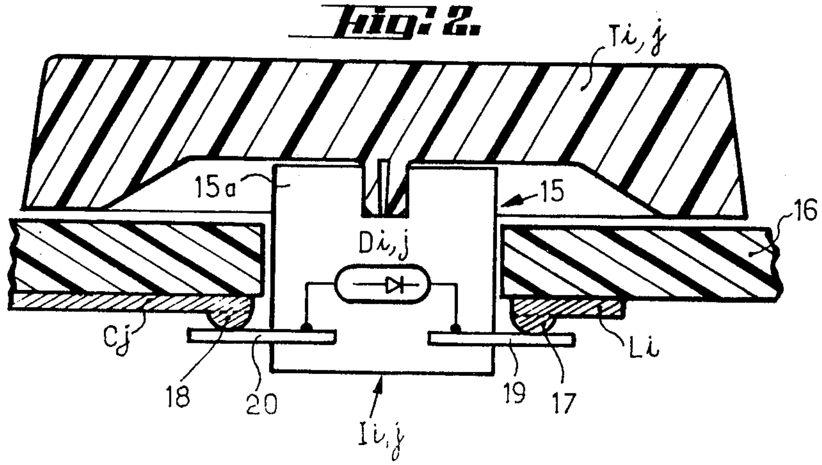
FIG. 2 is a detailed view in cross section of an advantageous technological keyboard construction in which the switch having a mechanical structure and the diode are combined together.

Referring to FIG. 2 it is seen that it is possible also to combine any key $T_{i,j}$ together with its switch $I_{i,j}$ and with the associated diode $D_{i,j}$ into a compact unit or assembly. Thus, each key comprises a lower core 15 performing a guiding function in a supporting plate 16 the bottom face of which may, for example, be arranged as a printed circuit carrying the conductors $L_i$ and $C_j$. The core 15 also forms a movable contact part or member adapted to contact in the rest position (such as shown in FIG. 2) in engaging relationship two terminals 17, 18 electrically connected to the conductors $L_i$ and $C_j$, respectively. According to an advantageous feature of the invention, the movable contact part comprises an insulating portion 15*a* forming a substantial part of the core and two electrically insulated conducting elements 19, 20 spaced from each other and projecting sidewise from the core 15 so as to be engageable with the terminals 17, 18, respectively; the diode $D_{i,j}$ is connected across both conducting elements 19, 20 while being preferably embedded in the middle of the insulating portion 15*a*. The latter also provides a holder or like anchoring support for both conducting elements 19, 20 thereby kept spaced from each other.

Referring now again to FIG. 1, an electromagnetic circuit adapted to make the keyboard just described operative will now be described by way of non-limiting example.

The electronic system comprises a signal generator 25 with multiplexed outputs and a signal analyzer 26 with multiplexed inputs; both of these devices corresponding to the foregoing definition.

The signal generator 25 accordingly includes four multiplexed outputs $S_1$, $S_2$, $S_3$, $S_4$ connected to the row conductors $L_1$, $L_2$, $L_3$, $L_4$, respectively, whereas the signal analyzer comprises four multiplexed inputs $E_1$, $E_2$, $E_3$, $E_4$ connected to the column conductors $C_1$, $C_2$, $C_3$, $C_4$, respectively. Moreover the inputs $E_1$ to $E_4$ each receive a constant voltage applied thereto through the agency of respective resistors $R_1$, $R_2$, $R_3$, $R_4$ connected to a positive voltage source $+V$. The resistors $R_1$ to $R_4$ all have the same resistance value. The signal generator could of course, be connected as well to the column conductors and the signal analyzer could be connected to the row conductors. Furthermore, the signal generator 25 comprises a reference input $E_o$ connected to a reference potential $V_o$ (preferably the input $E_o$ is grounded or connected to ground) and the whole operation of the generator 25 would amount to making the input $E_o$ correspond sequentially and cyclically to the various outputs $S_1$ to $S_4$ in a chosen order of succession. The switchings performed by the signal generator are controlled or operated by pulses fed to a control input $e_2$.

The signal analyzer in turn comprises a control input $e_1$ receiving drive pulses setting the timing or rate with which the inputs $E_1$ to $E_4$ are successively scanned and analyzed. The input $e_1$ is connected to a first sequential pilot or monitoring means consisting of a clock H and of a first counter 28 whereas the input $e_2$ is connected to a second sequential pilot or monitoring means (combined with the first one) consisting of the clock H and of the counters 28 and 29 mounted in parallel. Thus, the operating frequency of said first sequential pilot or monitoring means is higher than the operating frequency of the second sequential pilot or monitoring means and these operating frequencies would set the timing or rate of analysis of the states or conditions of the inputs $E_1$ to $E_4$, on the one hand, and the timing or rate of the sequential switchings of the voltage $V_o$ at the various outputs $S_1$ to $S_4$ on the other hand. The ratio of both operating frequencies is at least equal to the number of the multiplexed inputs of said signal analyzer so that the latter has time enough "to scan" all of the inputs $E_1$ to $E_4$ during the time interval where the voltage $V_o$ is present at one of the outputs $S_1$ to $S_4$. By way of example a prototype has been made wherein the counter 28 supplies drive pulses at 50 kHz and wherein the counter 29 supplies drive pulses at 5 kHz.

When the significant voltage $V_o$ (the ground potential) is applied to any one of the outputs $S_1$ to $S_4$, all the inputs $E_1$ to $E_4$ would receive substantially the same voltage through the agency of the switches and diodes connected to the row conductor involved. If, however, a key of this row is depressed, the corresponding column conductor is isolated and a voltage $+V$ appears at one of the inputs of the analyzer 26. This phenomenon is sensed by the analyzer during the sequence of scanning and analysis of the inputs $E_1$ to $E_4$. When such a phenomenon occurs, a storage means, not shown, connected to the generator 25 and to the analyzer 26 records both the output of the generator 25 which is momentarily connected to the reference input $E_o$ and the input of the analyzer 26 which temporarily receives the voltage $+V$. The co-ordinates of the key which has been depressed are stored in this manner.

It should be understood that the invention is not limited to the foregoing description but that it comprises all the technical equivalents of the means described as well as their combinations if the same are used according to its gist and within the scope of the appended claims.

What is claimed is:

1. A keyboard wherein each key is provided with a magnetic biasing means for urging the same back to a rest position and is operatively coupled to at least one single-pole switch, each switch comprising a movable contact part including two conducting elements electrically insulated from each other and wherein said switches are electrically connected to a system of conductors arranged in a matrix-like array with m rows and n columns, each row and each column being carried out as a conductor so that any switch having the coordinates i, j is connected between the row i and the column j of said system and adapted in the rest position of the switch to contact in engaging relationship, two terminals electrically connected to the corresponding conductors of the row and of the column of said system and a diode-like element associated with said switch being connected across both conducting elements, wherein the improvement consists in that each of said switches is of the normally closed contact type and comprises a diode-like element, said diode-like element being inserted within an insulating portion of said switch, said insulating portion forming an anchoring support keeping both conducting elements spaced from each other, said diode-like element being connected in series within the switch, the direction of connection of all said diodes being the same between the rows and the columns.

2. In combination with a keyboard according to claim 1, a machine further comprising a signal generator with multiplexed outputs which are connected to the row (or column) conductors of said keyboard, a signal analyzer with multiplexed inputs which are connected to the column (or row) conductors of said keyboard, a first sequential monitoring means connected to said signal analyzer and a second sequential monitoring means connected to said signal generator, said first and second monitoring means having differing operating frequencies.

3. A machine according to claim 2 wherein the operating frequency of said first sequential monitoring means is higher than the operating frequency of said second sequential monitoring means.

4. A machine according to claim 3 wherein the ratio of both aforesaid operating frequencies is at least equal to the number of multiplexed inputs of said signal analyzer.

5. A machine according to claim 2 wherein the significant signal supplied by said signal generator with multiplexed outputs is at a substantially zero voltage level.

* * * * *